United States Patent
Satish et al.

(10) Patent No.: US 9,230,105 B1
(45) Date of Patent: Jan. 5, 2016

(54) DETECTING MALICIOUS TAMPERING OF WEB FORMS

(71) Applicant: Symantec Corporation, Mountain View, CA (US)

(72) Inventors: Sourabh Satish, Fremont, CA (US); Abubakar A Wawda, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 299 days.

(21) Appl. No.: 14/041,661

(22) Filed: Sep. 30, 2013

(51) Int. Cl.
  *H04L 29/06* (2006.01)
  *G06F 21/56* (2013.01)

(52) U.S. Cl.
  CPC .......... *G06F 21/56* (2013.01); *H04L 63/1466* (2013.01); *H04L 63/1483* (2013.01)

(58) Field of Classification Search
  CPC .......... H04L 63/1433; H04L 63/1466; H04L 63/123; H04L 63/1483; G06F 21/55; G06F 21/552; G06F 21/56; G06F 21/561; G06F 21/566
  See application file for complete search history.

(56) References Cited

U.S. PATENT DOCUMENTS

| | | | | |
|---|---|---|---|---|
| 9,009,821 | B2* | 4/2015 | Podjarny | H04L 63/1441 726/22 |
| 9,122,870 | B2* | 9/2015 | Ford | H04L 63/1466 |
| 2010/0218253 | A1* | 8/2010 | Sutton | G06F 21/554 726/23 |
| 2013/0007886 | A1* | 1/2013 | Tripp | H04L 63/1433 726/25 |
| 2013/0073853 | A1* | 3/2013 | Ford | H04L 63/1466 713/168 |
| 2013/0081135 | A1* | 3/2013 | Podjarny | H04L 63/1441 726/22 |
| 2013/0179979 | A1* | 7/2013 | Pistoia | H04L 63/1433 726/25 |

* cited by examiner

*Primary Examiner* — Tae Kim
(74) *Attorney, Agent, or Firm* — Brill Law Office; Jeffrey Brill

(57) ABSTRACT

Telemetry data concerning web pages that users attempt to access containing fields prompting entry of personal information is received from many client computers over time. Based on the telemetry data, it is determined which fields prompting entry of personal information are expected to be present on specific web pages. The fields prompting entry of personal information on web pages users attempt to access are compared to the fields expected to be present. When a specific user attempts to access a specific web page in real-time, it can be adjudicated on-the-fly that the web page is suspicious, based on the web page containing at least one unexpected field. Correlations between web pages containing specific unexpected fields and the hygiene ratings of the users attempting to access the web pages when the unexpected fields are encountered can be tracked and taken into account in the adjudication of web pages.

20 Claims, 3 Drawing Sheets

DETECTING MALICIOUS TAMPERING OF WEB FORMS

TECHNICAL FIELD

This disclosure pertains generally to computer security, and more specifically to detecting the malicious injection of fraudulent fields prompting the entry of personal information in otherwise benign web forms.

BACKGROUND

There is a class of malware that injects extra fields over real web pages that contain forms requesting the entry of personal information, such as financial institution login screens. Typically, these new maliciously injected fields prompt the user to enter sensitive information, such as a credit card number, social security number, PIN, etc. When the user visits the page containing the web form (for example, the user tries to login into his or her actual bank account), these extra fields appear seamlessly on the otherwise legitimate website. However, even though the website itself is legitimate and familiar to the user, the added fields are actually fraudulent, and if the user fills them out, the entered information is transmitted to a remote server under the control of a malicious party. The malicious party can then leverage the user's personal information to financially defraud or otherwise exploit the user. Trojans generated by the infamous SpyEye botnet work this way.

Conventional techniques for detecting and removing malware can be very effective in many cases, but can fail to detect some malware. For example, scanning files for known signatures associated with malware can detect infection by previously identified threats and variations thereof that still contain a sufficiently similar signature. However, such signature based scanning can fail to identify new or sufficiently morphed malware. Likewise, heuristic based analysis of a program's behavior or other factors can detect malware that sufficiently confirms with known historically identified patterns, but can fail to identify new or modified threats that fall outside of these parameters.

It would be desirable to address these issues as they apply to malware that inserts malicious fields into legitimate forms.

SUMMARY

Telemetry data concerning web pages that contain fields prompting entry of personal information is received from a large base of client computers over time. The telemetry data concerning web pages which users attempt to access is locally gathered by the client computers. The telemetry data for each attempt to access a specific web page comprises at least an identifier of the user, the time of the access attempt, an identifier of the web page and identifiers of fields contained in the web page prompting entry of personal information. Additional information can also be included in the telemetry data, such as context setting demographic information (e.g., client geo-locations, web page languages, etc.). The telemetry data can be gathered by parsing Uniform Resource Locators ("URLs") of web pages which users of the client computers attempt to access, analyzing Hypertext Markup Language ("HTML") describing the web pages and/or analyzing the rendering of the web pages. In any of these scenarios, web pages that contain fields prompting entry of personal information are identified.

Based on the telemetry data, it is determined which fields prompting entry of personal information are expected to be present on each specific web page for which telemetry data has been received from a threshold base of users (in some embodiments, only users with one or more specific properties are counted). In some embodiments, different sets of expected fields are determined for different contexts, such as different geo-locations of accessing client computers and different language versions of the web page.

It is adjudicated whether web pages users are attempting to access are suspicious, based on whether the web pages contain one or more unexpected fields prompting for entry of personal information. The fields prompting entry of personal information on the web page the user is attempting to access are compared to the fields expected to be present. When a specific user attempts to access a specific web page in real-time, it can be adjudicated on-the-fly that the web page is suspicious, based on the web page containing at least one unexpected field. In one embodiment, the first time that a specific unexpected field is detected on a specific web page, the specific web page is automatically adjudicated as being suspicious.

In some embodiments, other factors can also be taken into account in making such adjudications (e.g., when previously encountered unexpected fields are encountered again on given web pages). For example, in one embodiment, correlations are tracked between web pages containing specific unexpected fields and the hygiene ratings of the users attempting to access the web pages when the unexpected fields are encountered. In response to a statistically significant number of users with bad hygiene encountering specific unexpected fields on a specific web page and a statistically significant number of users with good hygiene not encountering the same specific unexpected fields on the same specific web page, it is inferred that the specific unexpected fields are fraudulent, and hence the web page is adjudicated to be suspicious. In response to adjudicating a specific web page to be suspicious, additional steps can be performed to intervene in the attempt to access the web page, such as communicating a warning message to the client computer, blocking data from being entered into the unexpected field(s) (or any fields) of the web page and/or redirecting the user's access attempt to a known safe web site.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
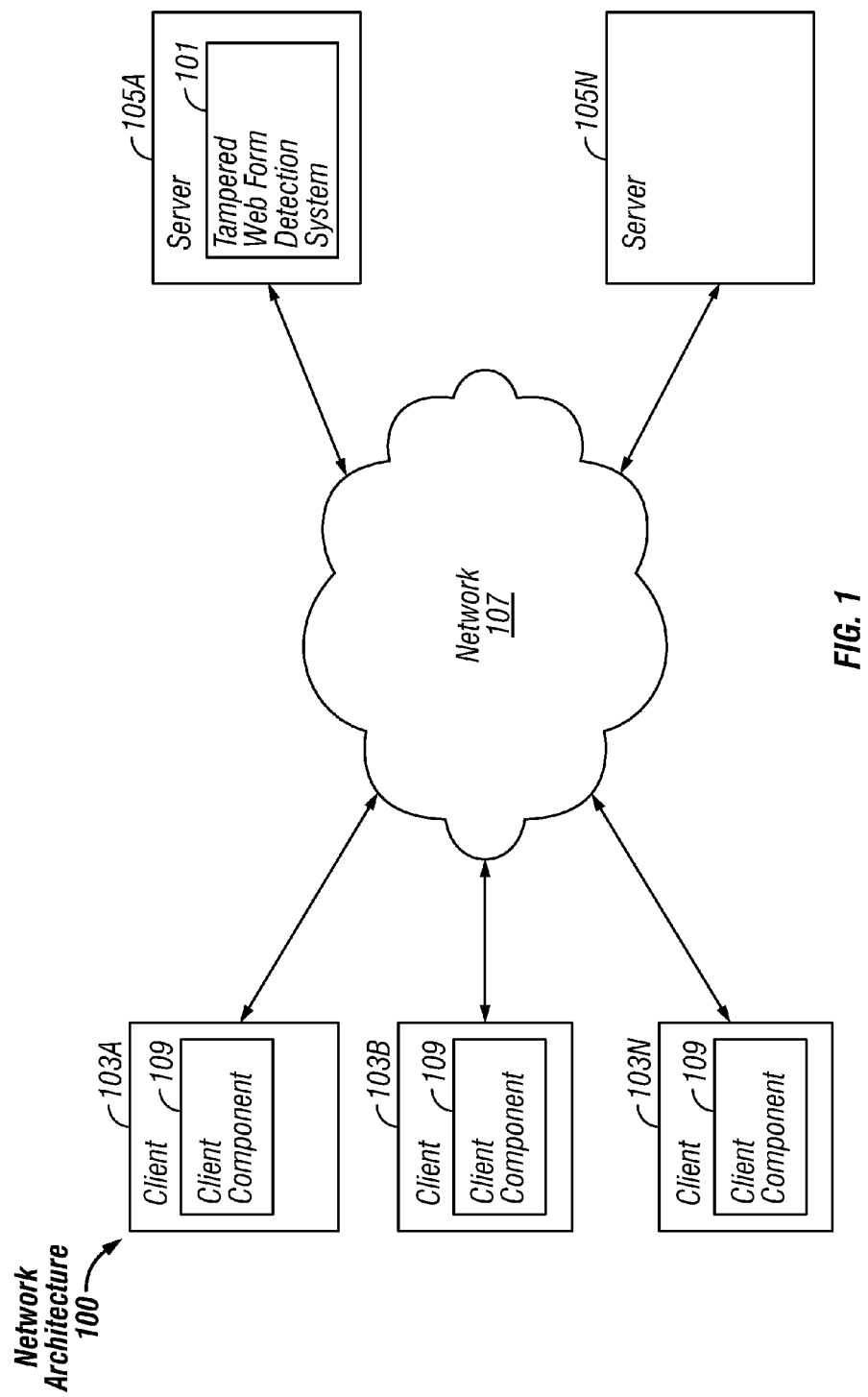
FIG. 1 is a block diagram of an exemplary network architecture in which a tampered web form detection system can be implemented, according to some embodiments.

FIG. 1 is a block diagram illustrating an exemplary network architecture 100 in which a tampered web form detection system 101 can be implemented. The illustrated network architecture 100 comprises multiple clients 103A, 103B and 103N, as well as multiple servers 105A and 105N. In FIG. 1, a tampered web form detection system 101 is illustrated as residing on server 105A, with a client component 109 on each client computer 103A-103N. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop/laptop computers, or mobile computing devices, comprising portable computer systems capable of connecting to a network 107 and running applications. Such mobile computing devices are sometimes referred to as smartphones, although many mobile phones not so designated also have these capabilities. Tablet computers are another example of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
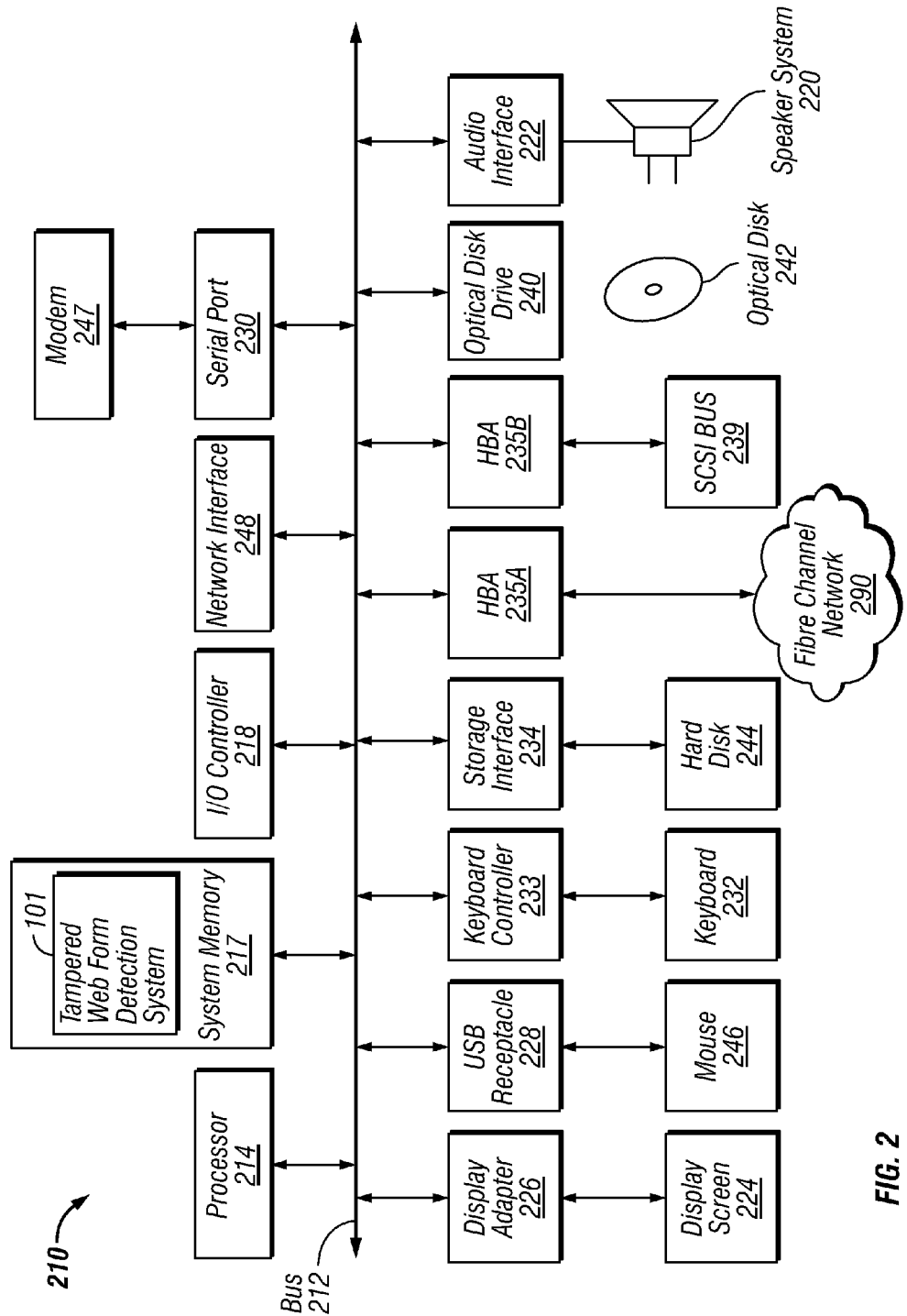
FIG. 2 is a block diagram of a computer system suitable for implementing a tampered web form detection system, according to some embodiments.

FIG. 2 is a block diagram of a computer system 210 suitable for implementing a tampered web form detection system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the tampered web form detection system 101 is illustrated as residing in system memory 217. The workings of the tampered web form detection system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
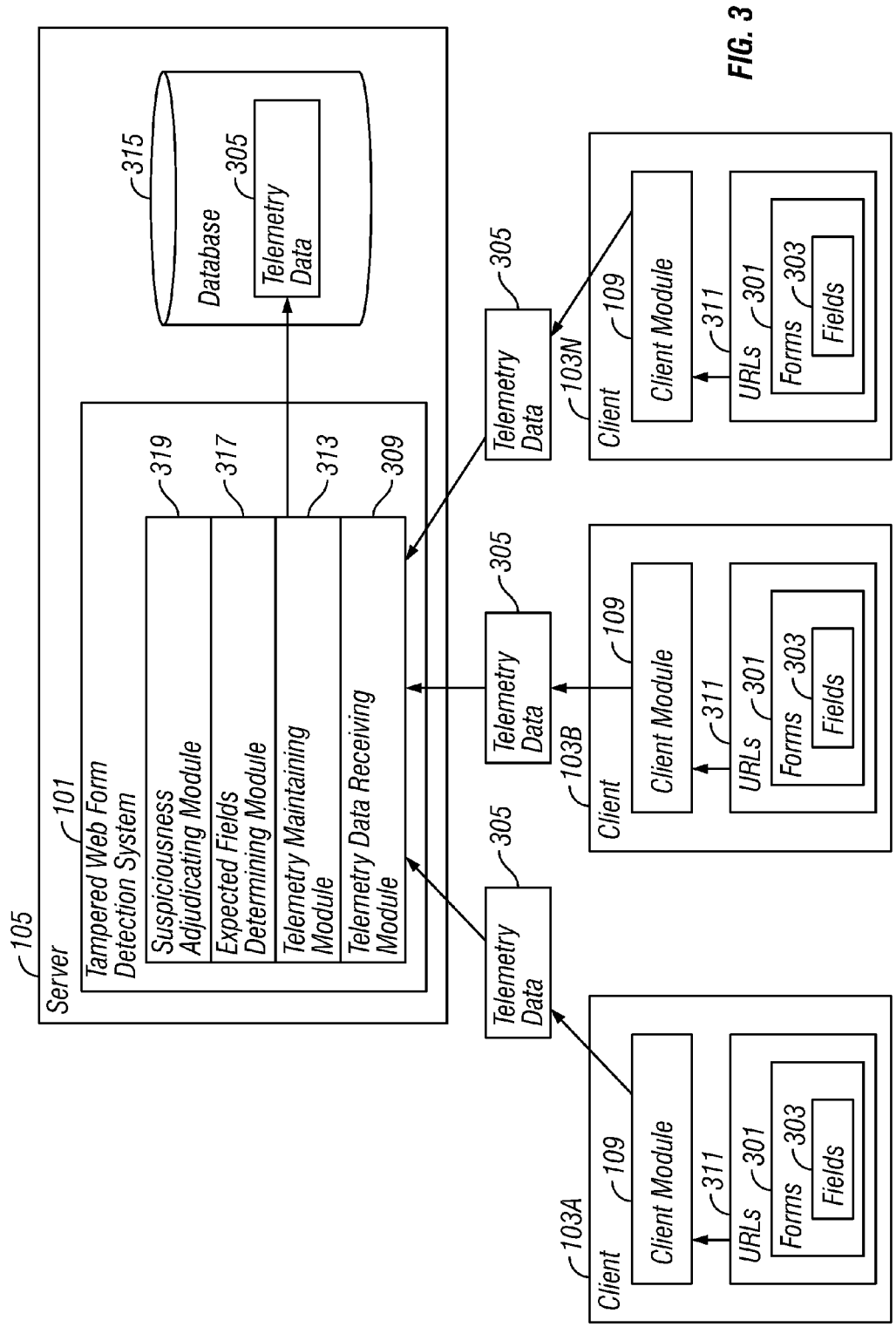
FIG. 3 is a block diagram of the operation of a tampered web form detection system, according to some embodiments.

FIG. 3 illustrates the operation of a tampered web form detection system 101, according to some embodiments. As described above, the functionalities of the tampered web form detection system 101 can reside on a client 103, a server 105, or be distributed between multiple computer systems 210, including within a cloud-based computing environment in which the functionality of the tampered web form detection system 101 is provided as a service over a network 107. It is to be understood that although the tampered web form detection system 101 is illustrated in FIG. 3 as a single entity, the illustrated tampered web form detection system 101 represents a collection of functionalities, which can be instantiated as a single or multiple modules as desired (an instantiation of specific, multiple modules of the tampered web form detection system 101 is illustrated in FIG. 3). It is to be understood that the modules of the tampered web form detection system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the tampered web form detection system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In the embodiment illustrated in FIG. 3, a tampered web form detection system 101 runs on a server 105, and detects web forms 301 that have been tampered with by the addition of one or more fraudulent fields 303 requesting personal information. To do so, the tampered web form detection system 101 receives telemetry data 305 concerning web pages that contain requests for personal information from multiple client computers 103. By mining the extensive telemetry data 305 received from a large user base, the tampered web form detection system 101 learns which fields 303 are expected to be present on specific web pages under different sets of circumstances. The tampered web form detection system 101 leverages this information to automatically detect web forms 301 that have been tampered with by malware running on a client 103, and takes corrective actions such as warning the user or preventing the user from entering data into the fraudulent fields 303. Thus, the tampered web form detection system 101 is not dependent on identifying signatures or behaviors, and is not specific in its design, use or applicability to any particular family of malware.

In addition to the server-side tampered web form detection system 101, a client component 109 runs on each client 103. Each client component 109 provides locally gathered telemetry data 305 to a telemetry data receiving module 309 of the tampered web form detection system 101 on the server 105. Although in FIG. 3 only three clients (103A, 103B and 103C) are shown for compactness of illustration, in practice orders of magnitude more would typically be deployed. For example, the tampered web form detection system 101 could be utilized in the context of a publisher of anti-malware software. In this context, the tampered web form detection system 101 would run on the backend along with other centralized security applications, and a separate client component 109 would run on each endpoint on which the anti-malware software is installed.

Looking at the client 103 level gathering of telemetry data 305 concerning web pages that contain requests for personal information in more detail, in one embodiment each client component 109 parses Uniform Resource Locators ("URLs") 311 of web pages accessed by the specific client computer 103 (e.g., via a web browser). By parsing the content of the URLs 311 (or other format of web page locator/identifier), the client component identifies any URLs 311 that contain fields 303 prompting the entry of personal information. Such fields 303 are identifiable to the client component 309 as having specific descriptions, values and/or syntax in Hypertext Markup Language ("HTML") (or other markup languages). As used herein, the term personal information means any information which can be used to personally identify a user and/or otherwise access a user's account. Examples include information such as a user's full or last name, username, password, PIN, social security number, driver's license number, credit card number, bank account number, date of birth, mother's maiden names, etc.

Whenever a client 103 attempts to access a page pointed to by a URL 311 containing one or more personal information fields 303, the client component 109 submits corresponding telemetry data 305 to the tampered web form detection system 101 on the server 105. The submitted telemetry data 305 includes an identification of the web page in question (this can be in the form of, e.g., the URL 311 itself), and the fields 303 thereon requesting personal information. The client component 109 can identify personal information fields 303 by analyzing the URL 311, the HTML describing the page and/ or the rendering of the page itself. The client component 109 can also submit additional information that can be used by tampered web form detection system 101 to identify fraudulent fields 303, such as the time of access, an identifier of the user, and/or context setting demographic information, such as the geo-location of the accessing client 103, the language of the page, etc. The exact information to provide can vary between embodiments as desired.

On the backend (i.e., at a server 105 level), a telemetry maintaining module 313 of the of the tampered web form detection system 101 maintains a database 315 (or other suitable storage mechanism) containing the received telemetry data 305 concerning identified web pages containing fields 303 prompting for the entry of personal information. As described above, the specific information gathered on the clients 103 and transmitted to the server-side tampered web form detection system 101 can vary between embodiments, but typically the telemetry 305 for a given access attempt by a specific client 103 includes at least the URL 311 that was visited and the specific personal information fields 303 on the web page, as well as the user and access time. Thus, as the large number of clients 103 transmit telemetry 305 to the backend over time, the database 315 becomes populated by an extensive collection of information identifying the personal information fields 303 on many different web pages visited by different users over time.

Based on this collection of telemetry data 305, an expected fields determining module 317 of the tampered web form detection system 101 determines what personal information fields 303 are expected to be present on different web pages that have been visited by a threshold user base. What specifically is considered a threshold user base is a variable design parameter, and different values can be used in different embodiments. In some embodiments, a given number of different users (e.g., five, twenty five, one hundred) having visited a specific web page is considered statistically sufficient to determine its expected fields 303, and hence is used a threshold. In some embodiments, only users with specific properties are counted towards this total, such as users without a history of being infected by malware, users from given geo-locations, users in trusted domains, etc. In some embodiments, different expected fields 303 are determined for different contexts, such as language, location, etc. For example, the fields 303 on a web page could be expected to vary as the web page is translated into different languages. Likewise, different fields 303 could be expected for users in different regions, for example due to variations between, e.g., banking regulations in different countries. In any case, by analyzing the received telemetry data 305 and determining what personal information fields 303 are expected on different web pages, the tampered web form detection system 101 is able to establish a base line for different web pages, and thus detect when those web pages have been maliciously tampered with by adding fraudulent fields 303.

More specifically, whenever a user operating a client 103 attempts to visit a web page containing personal information fields 303, the client component 109 sends the corresponding telemetry data 305 to the server-side tampered web form detection system 101, which adds the telemetry 305 to the database 315, as described above. In addition, a suspiciousness adjudicating module 319 of the tampered web form detection system 101 adjudicates whether the web page the user is attempting to visit is suspicious, based on whether it contains one or more unexpected fields 303. The suspiciousness adjudicating module 319 compares the fields 303 identified in the telemetry data 305 for the current access attempt to the expected fields 303 for the given web page (either in general or in a current context, such as language or geolocation), which are determined as described above. In other words, the personal information fields 303 in the URL 311 the user is attempting to access are compared to the fields 303 present on the web page when it was previously accessed, e.g., by a statistically significant number of other users. If no unexpected (extra) personal information fields 303 are present, the web page is adjudicated as being not suspicious, and the access attempt is allowed to proceed normally. On the other hand, where at least one unexpected personal information field 303 is detected, the web page can be adjudicated as being suspicious.

More specifically, in one embodiment the first time that a specific unexpected field 303 is detected for a specific web page (either in general or in a specific context), the web page is adjudicated to be suspicious per se, regardless of the nature of the user attempting access. In response to adjudicating that the web page is suspicious, different actions can be taken in different embodiments as desired. For example, the tampered web form detection system 101 can alert the user by communicating a warning message to the client 103 (e.g., by using a web API), block the user from entering data in the suspicious field(s) 303 (or in any field 303 of the form 305), redirect the user to a known safe site (e.g., by using an HTML redirect), etc.

Additional attempts by various users to access specific web pages occur over time. In some of these cases, specific unexpected fields 303 that have previously resulted in an adjudication of suspiciousness (in general or in context) are identified on specific web pages users attempt to access. When these subsequent access requests are detected, the suspiciousness adjudicating module 319 adjudicates in real-time whether the unexpected fields 303 on the page are sufficiently suspect of being fraudulent to intervene in the user's attempt to access the page (e.g., warn the user, block entry of data into the form 305/unexpected field(s) 303, redirect the access attempt, etc.). In other words, an adjudication is made on-the-fly as to whether the specific unexpected field(s) 303 on the page are sufficiently suspicious to affect the specific access attempt by the specific user.

In one embodiment, the historical "malware infection hygiene" of the given user attempting the access is taken into account in this analysis. In this context a user's "malware infection hygiene" is a measurement of the user's history of having become infected with malware, and/or having engaged in online behavior creating specific risk of such infection. In this embodiment, the tampered web form detection system 101 tracks infection rates for users over time. As described above, the tampered web form detection system 101 can be deployed in conjunction with anti-malware software. When individual clients 301 become infected with malware, the infections are detected and remedied by the anti-malware software, which also reports the information to a central server 105, and in this embodiment, to the tampered web form detection system 101 as well. Likewise, successful attempts to block infections resulting from risky behavior (e.g., browsing to unsafe sites, clicking on links in emails from unknown sources, transmitting personal information to known malicious parties, etc.) are reported to the tampered web form detection system 101 by the anti-malware software. Using this information, the tampered web form detection system 101 tracks the hygiene of users over time, and rates the hygiene of each user based on their infection history. The exact level of specificity according to which to rate user hygiene as a variable design parameter.

In one embodiment, users are simply rated as having good or bad hygiene, based on whether or not they have a known history of injection and/or risky behavior. In other embodiments, finer levels of gradation are used (e.g., "poor, fair, good, very good, excellent or unknown", a numerical rating on a scale of 0-100, etc.). In some embodiments, any malware infection event has the same effect on a user's hygiene rating, whereas in other embodiments different events are weighted differently (e.g., infection by a stealth Trojan that infected 90% of an enterprise less detrimental to a user's hygiene rating than infection resulting from clicking on a link in a phishing email).

In one embodiment in which user hygiene is taken into account as a factor in suspiciousness adjudication, the tampered web form detection system 101 tracks correlations between web pages containing specific unexpected fields 303 and the hygiene ratings of the users attempting access. Where users with bad hygiene attempt to access a given page with specific unexpected fields 303 more frequently than users with good hygiene, the tampered web form detection system 101 can take this correlation into account when adjudicating whether the unexpected fields 303 are in fact sufficient grounds for intervening in an access attempt. If a statistically significant number of users with bad hygiene report encountering unexpected fields 303 on a given web page that are absent (i.e., not encountered) when a statistically significant number of users with good hygiene visit the same page, the tampered web form detection system 101 can infer that these unexpected fields 303 are fraudulent (i.e., they were injected by malware). This is so because the unexpected fields 303 are being encountered and reported at a statistically significant level by the types of users more likely to be infected with malware. In other words, all else being equal, a pattern of users with bad hygiene encountering unexpected fields 303 when accessing a given URL 311 is grounds for greater suspicion than if the fields 303 were being encountered by users with good hygiene. What specifically is considered a statistically significant number of users in this context is a variable design parameter, and different values can be used in different embodiments.

It is also a variable design parameter exactly when to adjudicate a given attempt by a specific user to access a given URL 311 with unexpected fields 303 as being suspicious enough to take action. At one end of the spectrum, a single attempt to access the URL 311 by a user with bad hygiene resulting in a report of unexpected field(s) 303 is enough, whereas in other embodiments a ratio (or other formula) of access attempts by users with bad hygiene to those with good hygiene is used. The exact ratio of access attempts coming from bad hygiene users sufficient to trigger suspicion is a variable design parameter (e.g., at least 35% bad, a majority bad, 75% bad, etc.). Other formulas (including more complicated ones) can be used in other embodiments. In embodiments in which hygiene is rated at a finer level of granularity, the exact rating can be used as a weight in making such calculations.

In other embodiments, factors concerning the user (or other circumstances concerning the access attempt) other than hygiene are taken into account when adjudicating the suspiciousness of unexpected personal information fields 303 in specific URLs 311. In general, whenever the tampered web form detection system 101 receives a request to access a web page with unexpected personal information fields 303, the suspiciousness adjudicating module 319 makes an adjudication as to whether the access is to be permitted, or whether the unexpected fields 303 are sufficiently suspicious under the totality of the circumstances to take protective action, such as blocking, preventing data entry, redirecting the request, etc. This adjudication is made on-the-fly for the given user in context, and the history of user's malware infection hygiene is one factor that can be taken into account as evidence. In other embodiments, different or additional factors (or no factors at all other than the presence of the unexpected fields 303 themselves) can be taken into account in the adjudication analysis as desired.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for protecting computer users from malware that adds fraudulent fields to otherwise legitimate web forms, wherein the fraudulent fields prompt the users to enter personal information, the method comprising the steps of:
   receiving, by a server computer from multiple client computers over time, telemetry data concerning web pages that contain fields prompting entry of personal information, the telemetry data having been locally gathered by the client computers concerning web pages which users of the client computers attempt to access, wherein the telemetry data for each attempt to access a specific web page comprises at least an identifier of the user, a time of the access attempt, an identifier of the web page and identifiers of fields contained in the web page prompting entry of personal information;
   for each web page containing fields prompting entry of personal information concerning which the server computer has received telemetry data from a threshold user base, determining, by the server computer, which fields prompting entry of personal information are expected to be present on the specific web page, based on the telemetry data concerning the specific web page received from multiple client computers over time;
   adjudicating, by the server computer, whether web pages users are attempting to access containing fields prompting entry of personal information are suspicious, based at least on whether the web pages contain at least one unexpected field prompting entry of personal information;
   adjudicating on-the-fly, by the server computer, a specific web page which a specific user is attempting to access in real-time, as being suspicious, based at least on whether the specific web page contains at least one unexpected field prompting entry of personal information; and
   in response to adjudicating the specific web page to be suspicious, performing at least one step, by the server computer, to intervene in the attempt by the specific user to access the specific web page.

2. The method of claim 1 wherein receiving telemetry data concerning web pages that contain fields prompting entry of personal information further comprises:
   receiving telemetry data having been locally gathered by the client computers by 1) parsing Uniform Resource Locators ("URLs") of web pages which users of the client computers attempt to access and 2) identifying web pages that contain fields prompting entry of personal information.

3. The method of claim 1 wherein receiving telemetry data concerning web pages that contain fields prompting entry of personal information further comprises:
   receiving telemetry data having been locally gathered by the client computers by 1) analyzing Hypertext Markup Language ("HTML") describing web pages which users of the client computers attempt to access and 2) identifying web pages that contain fields prompting entry of personal information.

4. The method of claim 1 wherein receiving telemetry data concerning web pages that contain fields prompting entry of personal information further comprises:
   receiving telemetry data having been locally gathered by the client computers by 1) analyzing renderings of web pages which users of the client computers attempt to access and 2) identifying web pages that contain fields prompting entry of personal information.

5. The method of claim 1 wherein determining which fields prompting entry of personal information are expected to be present on a specific web page based on the telemetry data concerning the specific web page received from multiple client computers over time further comprises:
   determining a first set of specific fields expected to be present on the specific web page in a first context and a second set of specific fields expected to be present on the specific web page in a second, different context, wherein the telemetry data concerning the specific web page received from multiple client computers over time further comprises context setting demographic information.

6. The method of claim 5 wherein the first context and the second context consist of one from a group consisting of: a first and a second geo-location of accessing client computers and a first and a second language of the web page.

7. The method of claim 1 further comprising:
   counting only users with at least one specific property towards the threshold user base.

8. The method of claim 1 wherein adjudicating on-the-fly a specific web page which a specific user is attempting to access in real-time as being suspicious further comprises:
   comparing fields prompting entry of personal information on the specific web page the specific user is attempting to access in real-time to the fields prompting entry of personal information determined to be expected to be present on the specific web page based on received telemetry data; and
   adjudicating on-the-fly the web page the user is attempting to access in real-time as being suspicious based at least on detecting at least one unexpected field.

9. The method of claim 8 wherein adjudicating on-the-fly the web page the user is attempting to access in real-time as being suspicious based at least on detecting at least one unexpected field further comprises:
   adjudicating on-the-fly the web page the user is attempting to access in real-time as being suspicious based on detecting a specific unexpected field for the first time.

10. The method of claim 1 further comprising:
    tracking correlations between web pages containing specific unexpected fields and hygiene ratings of users attempting to access those web pages; and responsive to a statistically significant number of users with bad hygiene encountering the specific unexpected fields on a specific web page and a statistically significant number of users with good hygiene not encountering the same specific unexpected fields on the same specific web page, inferring that the specific unexpected fields are fraudulent.

11. The method of claim 10 wherein adjudicating on-the-fly the web page the user is attempting to access in real-time as being suspicious based at least on detecting at least one unexpected field further comprises:
adjudicating on-the-fly the web page the user is attempting to access in real-time as being suspicious based on detecting a specific unexpected field inferred to be fraudulent in responsive to a statistically significant number of users with bad hygiene encountering the specific unexpected field on the web page and a statistically significant number of users with good hygiene not encountering the specific unexpected field on the web page.

12. The method of claim 1 wherein performing at least one step to intervene in the attempt by the specific user to access the specific web page in response to adjudicating the specific web page to be suspicious further comprises performing a step from a group of steps consisting of:
communicating a warning message to the client computer; blocking data from being entered into at least unexpected fields of the web page; and redirecting the access attempt to a known safe web site.

13. At least one non-transitory computer readable-storage medium for protecting computer users from malware that adds fraudulent fields to otherwise legitimate web forms, wherein the fraudulent fields prompt the users to enter personal information, the at least one non-transitory computer readable-storage medium storing computer executable instructions that, when loaded into computer memory and executed by at least one processor of a computing device, cause the computing device to perform the following steps:
receiving, from multiple client computers over time, telemetry data concerning web pages that contain fields prompting entry of personal information, the telemetry data having been locally gathered by the client computers concerning web pages which users of the client computers attempt to access, wherein the telemetry data for each attempt to access a specific web page comprises at least an identifier of the user, a time of the access attempt, an identifier of the web page and identifiers of fields contained in the web page prompting entry of personal information;
for each web page containing fields prompting entry of personal information concerning which telemetry data has been received from a threshold user base, determining which fields prompting entry of personal information are expected to be present on the specific web page, based on the telemetry data concerning the specific web page received from multiple client computers over time;
adjudicating whether web pages users are attempting to access containing fields prompting entry of personal information are suspicious, based at least on whether the web pages contain at least one unexpected field prompting entry of personal information;
adjudicating on-the-fly a specific web page which a specific user is attempting to access in real-time, as being suspicious, based at least on whether the specific web page contains at least one unexpected field prompting entry of personal information; and
in response to adjudicating the specific web page to be suspicious, performing at least one step to intervene in the attempt by the specific user to access the specific web page.

14. The at least one non-transitory computer readable-storage medium of claim 13 wherein determining which fields prompting entry of personal information are expected to be present on a specific web page based on the telemetry data concerning the specific web page received from multiple client computers over time further comprises:
determining a first set of specific fields expected to be present on the specific web page in a first context and a second set of specific fields expected to be present on the specific web page in a second, different context, wherein the telemetry data concerning the specific web page received from multiple client computers over time further comprises context setting demographic information.

15. The at least one non-transitory computer readable-storage medium of claim 14 wherein the first context and the second context consist of one from a group consisting of: a first and a second geo-location of accessing client computers and a first and a second language of the web page.

16. The at least one non-transitory computer readable-storage medium of claim 13 wherein adjudicating on-the-fly a specific web page which a specific user is attempting to access in real-time as being suspicious further comprises:
comparing fields prompting entry of personal information on the specific web page the specific user is attempting to access in real-time to the fields prompting entry of personal information determined to be expected to be present on the specific web page based on received telemetry data; and
adjudicating on-the-fly the web page the user is attempting to access in real-time as being suspicious based at least on detecting at least one unexpected field.

17. The at least one non-transitory computer readable-storage medium of claim 16 wherein adjudicating on-the-fly the web page the user is attempting to access in real-time as being suspicious based at least on detecting at least one unexpected field further comprises:
adjudicating on-the-fly the web page the user is attempting to access in real-time as being suspicious based on detecting a specific unexpected field for the first time.

18. The at least one non-transitory computer readable-storage medium of claim 13 further comprising:
tracking correlations between web pages containing specific unexpected fields and hygiene ratings of users attempting to access those web pages; and
responsive to a statistically significant number of users with bad hygiene encountering the specific unexpected fields on a specific web page and a statistically significant number of users with good hygiene not encountering the same specific unexpected fields on the same specific web page, inferring that the specific unexpected fields are fraudulent.

19. The at least one non-transitory computer readable-storage medium of claim 18 wherein adjudicating on-the-fly the web page the user is attempting to access in real-time as being suspicious based at least on detecting at least one unexpected field further comprises:
adjudicating on-the-fly the web page the user is attempting to access in real-time as being suspicious based on detecting a specific unexpected field inferred to be fraudulent in responsive to a statistically significant number of users with bad hygiene encountering the specific unexpected field on the web page and a statistically significant number of users with good hygiene not encountering the specific unexpected field on the web page.

20. A computer system for protecting computer users from malware that adds fraudulent fields to otherwise legitimate web forms, wherein the fraudulent fields prompt the users to enter personal information, the computer system comprising:

at least one processor;

system memory;

a telemetry data receiving module residing in the system memory, the telemetry data receiving module being programmed to receive, from multiple client computers over time, telemetry data concerning web pages that contain fields prompting entry of personal information, the telemetry data having been locally gathered by the client computers concerning web pages which users of the client computers attempt to access, wherein the telemetry data for each attempt to access a specific web page comprises at least an identifier of the user, a time of the access attempt, an identifier of the web page and identifiers of fields contained in the web page prompting entry of personal information;

an expected fields determining module residing in the system memory, the expected fields determining module being programmed to determine, for each web page containing fields prompting entry of personal information concerning which telemetry data has been received from a threshold user base, which fields prompting entry of personal information are expected to be present on the specific web page, based on the telemetry data concerning the specific web page received from multiple client computers over time; and a suspiciousness adjudicating module residing in the system memory, the suspiciousness adjudicating module being programmed to adjudicate whether web pages that users are attempting to access containing fields prompting entry of personal information are suspicious based at least on whether the web pages contain at least one unexpected field prompting entry of personal information, to adjudicate on-the-fly a specific web page which a specific user is attempting to access in real-time as being suspicious based at least on whether the specific web page contains at least one unexpected field prompting entry of personal information, and to perform at least one step to intervene in the attempt by the specific user to access the specific web page in response to adjudicating the specific web page to be suspicious.

* * * * *